(12) United States Patent
Beard

(10) Patent No.: US 7,882,159 B2
(45) Date of Patent: Feb. 1, 2011

(54) ASSOCIATIVE REFERENCES IN A GARBAGE COLLECTED PROGRAMMING ENVIRONMENT

(75) Inventor: Patrick C. Beard, Danville, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 11/881,056

(22) Filed: Jul. 25, 2007

(65) Prior Publication Data

US 2009/0030959 A1    Jan. 29, 2009

(51) Int. Cl.
*G06F 17/30* (2006.01)
*G06F 12/00* (2006.01)

(52) U.S. Cl. .................... 707/814; 707/817
(58) Field of Classification Search .............. None
See application file for complete search history.

(56) References Cited

U.S. PATENT DOCUMENTS

| | | | |
|---|---|---|---|
| 5,241,673 A | | 8/1993 | Schelvis |
| 5,960,087 A | | 9/1999 | Tribble et al. |
| 6,226,653 B1 | * | 5/2001 | Alpern et al. ................... 1/1 |
| 6,647,547 B1 | * | 11/2003 | Kanamaru et al. ........ 717/151 |
| 6,671,707 B1 | * | 12/2003 | Hudson et al. ................... 1/1 |
| 6,826,583 B1 | * | 11/2004 | Flood et al. ....................... 1/1 |
| 6,957,237 B1 | * | 10/2005 | Traversat et al. ................. 1/1 |
| 6,994,637 B2 | * | 2/2006 | Murphy et al. ............. 473/345 |
| 7,115,919 B2 | | 10/2006 | Kodama |
| 7,305,538 B2 | | 12/2007 | Garst et al. |
| 7,308,466 B2 | | 12/2007 | Houldsworth |
| 7,428,560 B1 | * | 9/2008 | Detlefs et al. ................... 1/1 |
| 2002/0019716 A1 | * | 2/2002 | Agesen et al. ............... 702/83 |
| 2002/0166116 A1 | * | 11/2002 | Eidt ............................ 717/152 |
| 2003/0191783 A1 | * | 10/2003 | Wolczko et al. ............ 707/206 |
| 2004/0111451 A1 | * | 6/2004 | Garthwaite ................. 707/206 |
| 2006/0155943 A1 | | 7/2006 | Todd et al. |
| 2006/0248131 A1 | * | 11/2006 | Marwinski et al. ......... 707/206 |
| 2007/0203960 A1 | * | 8/2007 | Guo ............................ 707/206 |
| 2008/0140737 A1 | | 6/2008 | Garst et al. |

OTHER PUBLICATIONS

Matthew Hertz; Stephen M Blackburn; J Eliot B Moss; Kathryn S. McKinley; Darko Stefanovic Error-Free Garbage Collection Traces: How to Cheat and Not Get Caught 2002 http://www-cs.canisius.edu/-hertzm/merlin-sig metrics-2002.pdf.*
Hans-J. Boehm Fast Multiprocessor Memory Allocation and Garbage Collection Dec. 8, 2000 Internet and Mobile Systems Laboratory HP Laboratories Palo Alto.*

* cited by examiner

*Primary Examiner*—Neveen Abel Jalil
*Assistant Examiner*—Polina Peach
(74) *Attorney, Agent, or Firm*—Van Pelt, Yi & James LLP

(57) ABSTRACT

Associative references in a garbage collected programming environment is disclosed. An indication that an object is not reachable from any root object. The object is kept alive if it is determined by a garbage collection process, based at least in part on data other than data comprising the object or managed by an application with which the object is associated, that the object is associated with at least one other object that has been determined to be reachable.

17 Claims, 10 Drawing Sheets

600 ⬊

| Referring Object-Sub-table Associations ||
|---|---|
| Object | Sub-table |
|  |  |
|  |  |
|  |  |
|  |  |
|  |  |
|  |  |

620 ⬊

| Associative References ||
|---|---|
| Key | Value |
|  |  |
|  |  |
|  |  |
|  |  |
|  |  |
|  |  |

FIG. 6

ASSOCIATIVE REFERENCES IN A GARBAGE COLLECTED PROGRAMMING ENVIRONMENT

BACKGROUND OF THE INVENTION

Garbage collected programming environments have been provided to free application developers from having to manage the use of memory by an application and its associated objects, subroutines, etc. In a typical garbage collected environment, a garbage collection module and/or process, provided as part of a run time environment, for example, periodically traverses a set of objects residing in memory (e.g., in a "heap" associated with a particular runtime system, such as the Java™ Virtual Machine) and frees memory associated with objects that are no longer being used by an application or any other object or process. In some systems, a garbage collection includes a first stage in which the garbage collector traverses the objects in memory and marks those that are currently "reachable" from another "live" object and a second stage in which unmarked objects are "garbage collected", i.e., in which memory previously allocated and used to store such objects is made available to be allocated for other use.

In some programming environments, for example those in which the amount of memory to be allocated to a new object is not determined dynamically at run time, the size of objects of one or more classes may be subject to some predefined limit. In such an environment it may not be practical to change the size, for example, of a class that has or may have been sub-classed by application developers, e.g., if such resizing may result in objects of such sub-classes not functioning properly. Techniques, such as instance variable repurposing and side tables, have been developed and used to store in an ancillary object or structure data that cannot be stored within the bounds of an object the size of which cannot be changed, e.g., new variables or parameters associated with additional methods that the class or related code has been extended to include. However, such techniques may be difficult to implement and/or may confound a garbage collector process or require the application developer to manage the relationships between objects and such ancillary structures, thereby depriving the developer of the full benefit of programming in a garbage collected environment.

Therefore, there is a need for a way to extend pre-existing object classes to include and/or be associated with additional data in a garbage collected programming environment.

BRIEF DESCRIPTION OF THE DRAWINGS

Various embodiments of the invention are disclosed in the following detailed description and the accompanying drawings.

FIG. 6 is a block diagram illustrating an embodiment of data tables used to store data associated with associative references.

DETAILED DESCRIPTION

Figure 1:
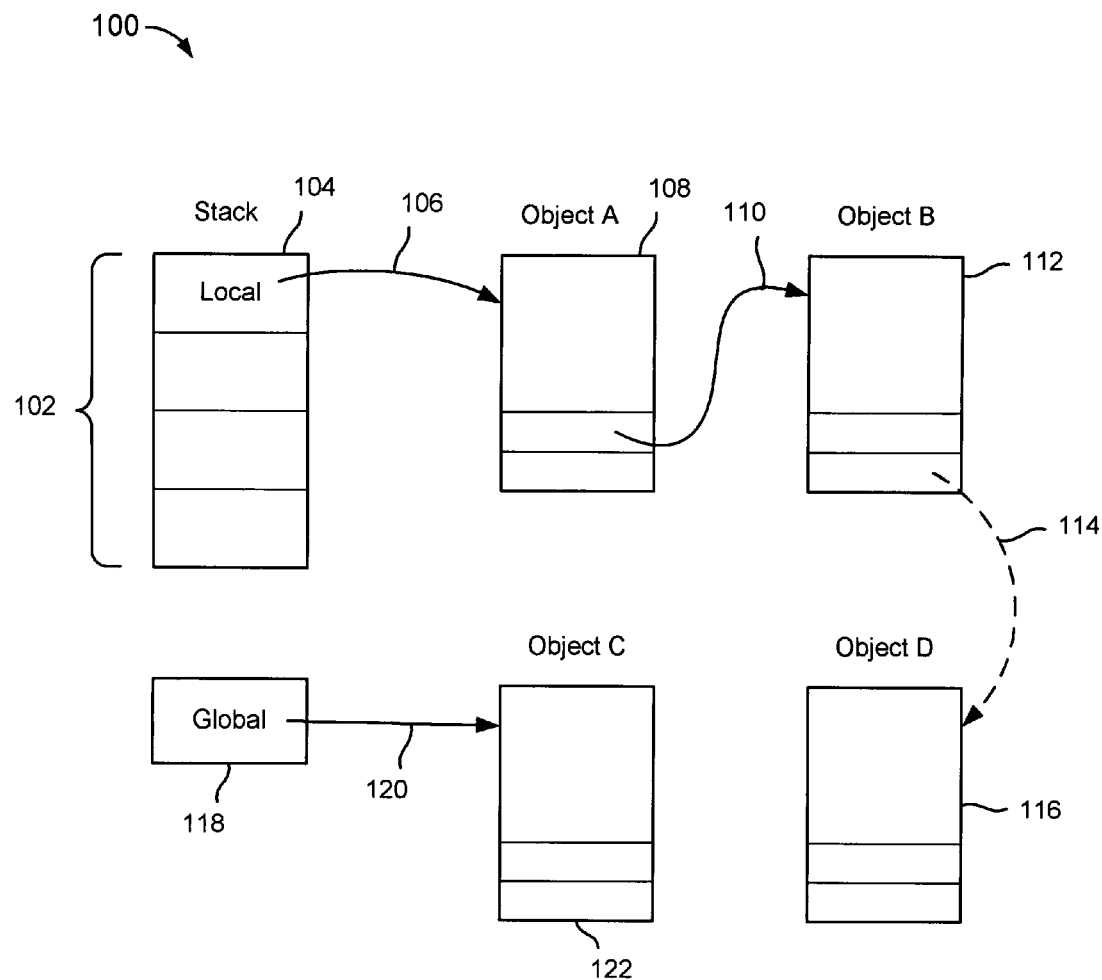
FIG. 1 is a block diagram illustrating an embodiment of a prior art garbage collected runtime environment.

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring a garbage collector to store and/or manage data associating a first object with a second object, and to keep the first object alive so long as the second object remains reachable, is disclosed. In some embodiments, if the second object is determined to be unreachable and the first object is not otherwise reachable, then the data associating the first object with the second object is removed and memory allocated to store the first object is made available for other use. In some embodiments, if an object such as the first object is determined not to be reachable via any explicit, strong reference from and/or associated with a live object, e.g., a strong reference from a local or global variable, then prior to garbage collecting the first object a check is made by the garbage collector to determine whether the garbage collector has stored and/or manages any data associating the first object strongly with a reachable object. As used herein, a "strong" reference or association is one that requires the referred to object to be kept alive so long as the referring object remains reachable or otherwise is kept alive. In some embodiments, if an otherwise unreachable object is determined to be associated, based on data that the garbage collector has stored and/or manages, to be associated strongly with a reachable object, the otherwise unreachable object and any object to which it refers strongly and/or that is associated with it by data stored and/or managed by the garbage collector is enlivened.

FIG. 1 is a block diagram illustrating an embodiment of a prior art garbage collected runtime environment. In the example shown, a set of objects 100 resides in a portion of memory, sometimes referred to as a "heap", associated with a runtime environment. In the example shown, a stack 102 includes one or more local variables, represented in FIG. 1 by local variable 104. Local variable 104 in this example contains a pointer that constitutes an explicit reference 106 to an object A (108). The reference 106 in this example is a "strong" reference, in that the object 108 is considered to be "reachable", and therefore required to be kept alive and not garbage collected, by virtue of the reference 106 being made to it from local variable 104 of stack 102. Object A (108) itself has an explicit, strong reference 110 to object B (112). In this example, object B (112) would also be considered reachable and therefore required to be kept alive because it is reachable from a root node (local variable 104 of stack 102) via a chain of strong references (106 and 110). In the example shown, object B (112) has a "weak" reference 114 to an object D (116). A weak reference is one that does not have the effect of requiring that the referred to object be kept alive. The weak reference is valid so long as the referred to object is kept alive for other reasons, e.g., another reachable object makes a strong reference to it. In the example shown, object D (116) does not have any strong reference to it and therefore would be subject to being garbage collected, i.e., having the memory allocated to it previously be de-allocated and made available to be allocated for other use, e.g., to store another object. Finally, in the example shown a global variable 118, which is considered a root node, makes a strong reference 120 to an object C (122), which would be considered reachable and therefore not subject to being garbage collected.

Figure 2:
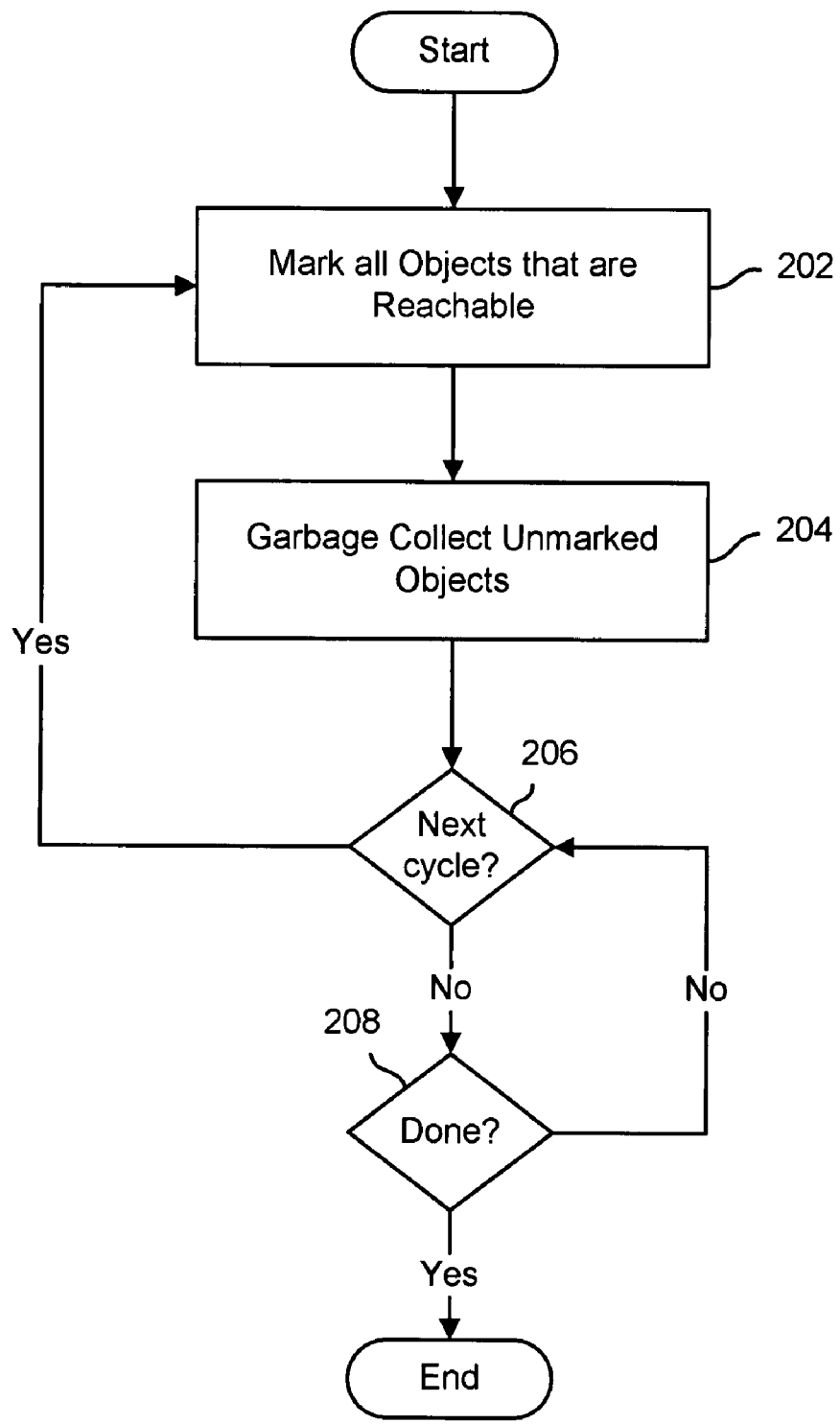
FIG. 2 is a flow chart illustrating an embodiment of a process for garbage collection in a runtime environment.

FIG. 2 is a flow chart illustrating an embodiment of a process for garbage collection in a runtime environment. Objects that are reachable are marked (202). As noted above, in some environments an object is marked if it is reachable from a root node in the object tree by a strong reference or a chain of strong references initiating at a root object. Once all objects that are reachable have been marked, unmarked objects, which are assumed to have been found not to be reachable, are garbage collected (204). In some environments, marking and sweeping may occur concurrently, and in some environments approaches other than the mark-and-sweep approach illustrated in FIG. 2 are used. In the example shown, the marking and sweeping steps are repeated with each garbage collection cycle (206) until garbage collection is no longer being performed (208), e.g., upon system or runtime environment shut down.

Figure 3:
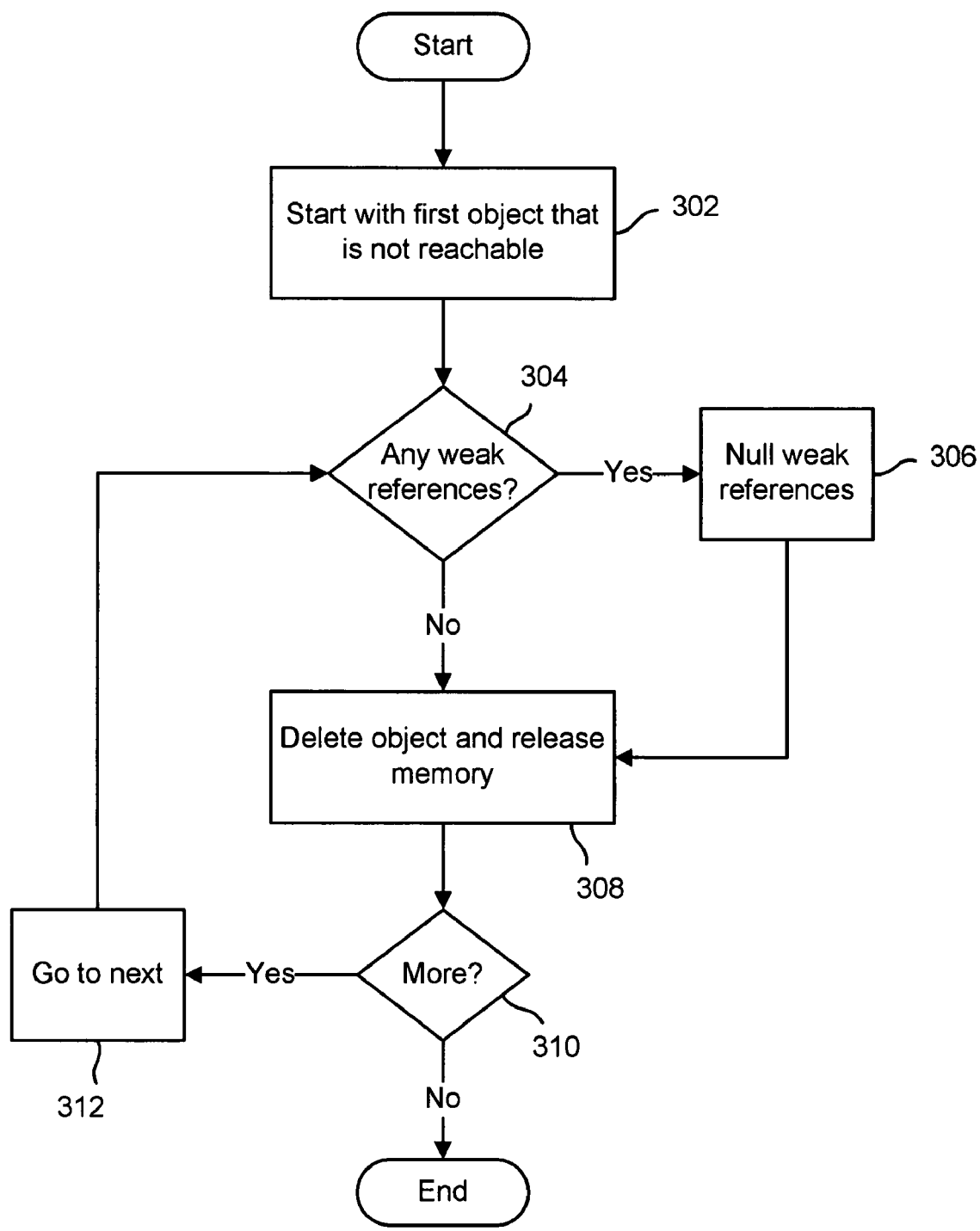
FIG. 3 is a flow chart illustrating an embodiment of a prior art process for garbage collecting unreachable objects.

FIG. 3 is a flow chart illustrating an embodiment of a prior art process for garbage collecting unreachable objects. In some environments, the process of FIG. 3 is used to implement 204 of FIG. 2. In the example shown, starting with a first unreachable object (302), it is determined whether the object has any weak references to it from other objects (304). If so, such references are "nulled" (306) to indicate to the referring object that the referred to object is no longer present. If there are no weak references to the object (304) or after all such references has been nulled (306), the object is finalized and the memory allocated to it previously is made available for other use (308). 304-308 are repeated, as applicable, for each unreachable object (310 and 312) until no more unreachable objects remain to be processed, after which the process ends.

A new type of reference, sometimes referred to herein as an "associative" reference, is disclosed. An associative reference has the enlivening effect of a strong reference without requiring that a referring object and/or an application with which the referring object is associated to manage data associating the referred to object with the referring object. Instead, the garbage collector, or another module process associated therewith, maintains a store of data representing the associative references made by objects associated with a runtime environment with which the garbage collector is associated.

Figure 4A:
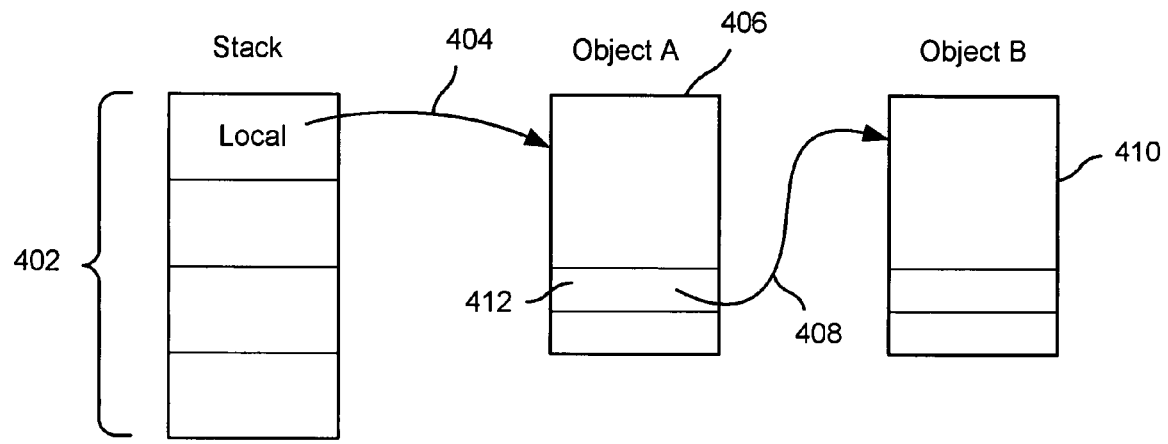
FIGS. 4A and 4B illustrate a comparison between a prior art strong reference and an embodiment of an associative reference.
Figure 4B:
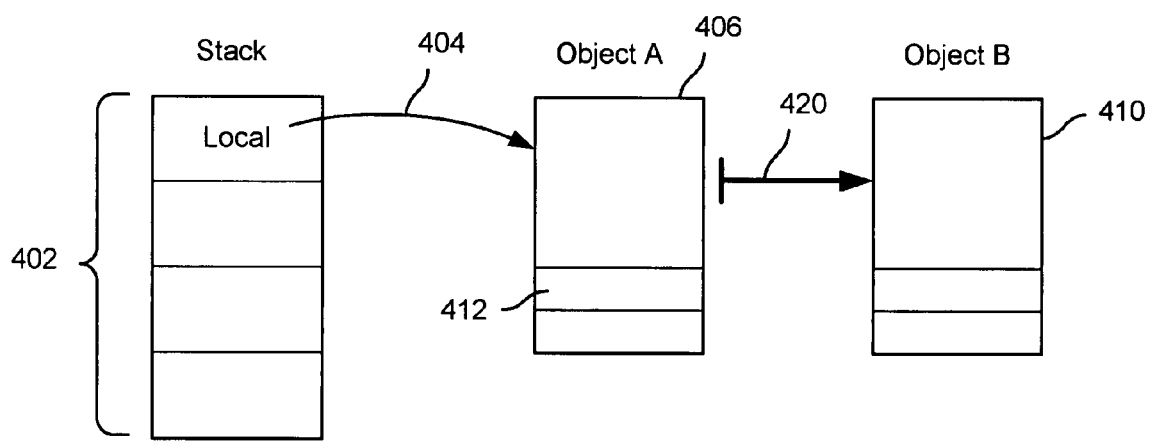

FIGS. 4A and 4B illustrate a comparison between a prior art strong reference and an embodiment of an associative reference. In FIG. 4A, a local variable of stack 402 makes a strong reference 404 to object A (406), which in turn has a strong reference 408 to object B (410). Data constituting reference 408 is stored in a slot 412 of object 406. In FIG. 4B, the same objects are shown, except that strong reference 408 from object 406 to object 410 has been replaced by an associative reference 420. In the example shown, the slot 412 is not used to store data representing associative reference 420. Instead, in some embodiments data representing associative reference 420 is stored in a data structure, such as a table, maintained by the garbage collector itself. For example, a plug in, API, or other technique is used to extend the behavior of a garbage collector to support the creation, maintenance, and enforcement of the effects of an associative reference, e.g., by guaranteeing that an object to which an associative reference is made by a referring object that is itself reachable is kept alive. In some embodiments, a referring object and/or other code associated with an application with which the referring object is associated passes to the garbage collector data identifying the referring object, a key, and a "value" comprising data identifying the object to which the associative reference is made. In some embodiments, so long as the referring object remains reachable, an object to which such an associative reference has been made (and has not been removed) is kept alive.

Figure 5A:
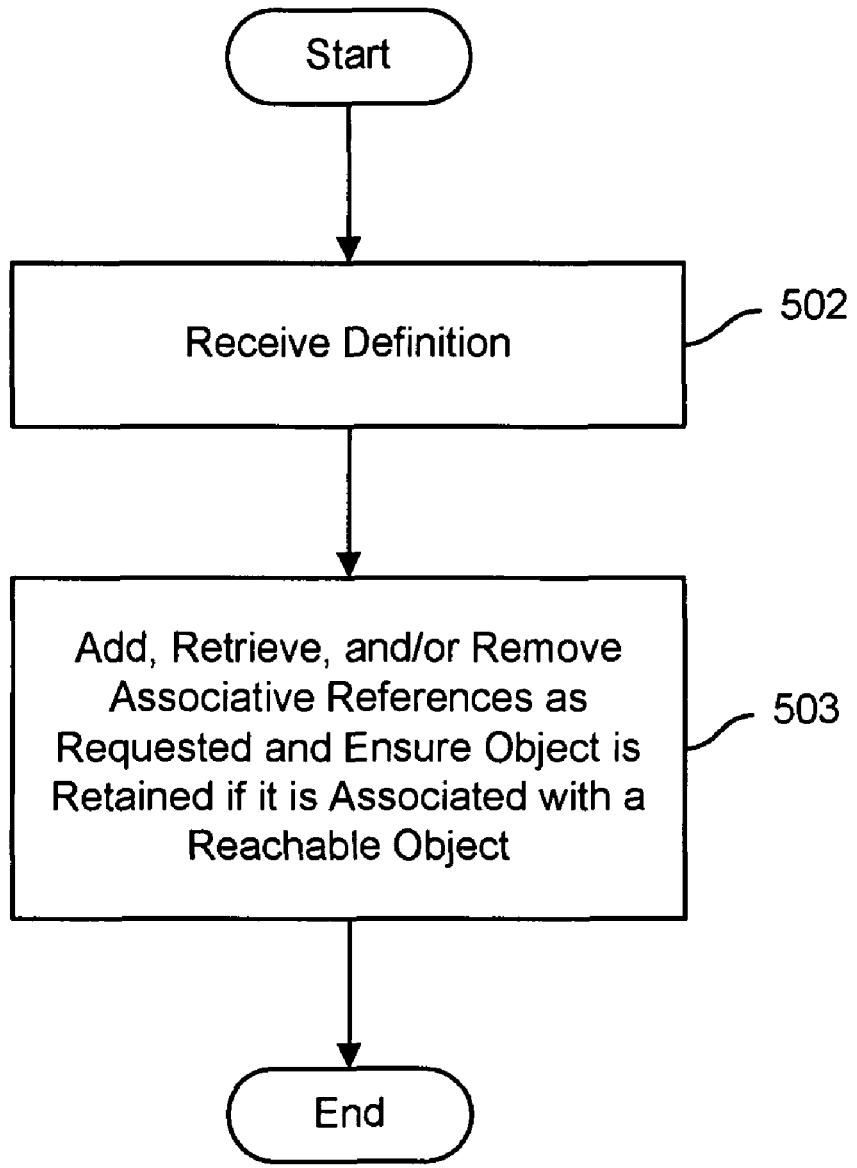
FIG. 5A is a flow chart illustrating an embodiment of a process for providing associative reference functionality.

FIG. 5A is a flow chart illustrating an embodiment of a process for providing associative reference functionality. A definition of an associative reference feature is received (502). In some embodiments, 502 comprises receiving a plug in that extends a garbage collector's behavior as required to provide the ability for applications to set and retrieve associative references, and to enforce the "strong" reference-like effects of such associative references. For example, a call to "set_associative_reference(object, key, value)" that results in the garbage collector storing data that associates the "key" with the referring "object" and the referred to object ("value") is defined, as well as a corresponding call to "get_associative_reference(object, key)", which returns the associated "value" (e.g., a pointer to the referred to object), are defined. Also, the behavior of the garbage collector is extended to ensure that so long as an object is reachable, any associated "keys" are considered to be alive and any objects comprising and/or corresponding to the "values" associated with any such keys, and any objects reachable from any such objects, are enlivened. In some embodiments, the "key" is opaque and does not necessarily have any meaning to the collector. Instead, each key is merely a unique bit pattern, generated by application code, for example. Associative references are added, retrieved, enforced, and/or removed, as applicable, e.g., in response to calls from application and/or other code and/or in the course of garbage collection cycles, as described more fully below (503).

Figure 5B:
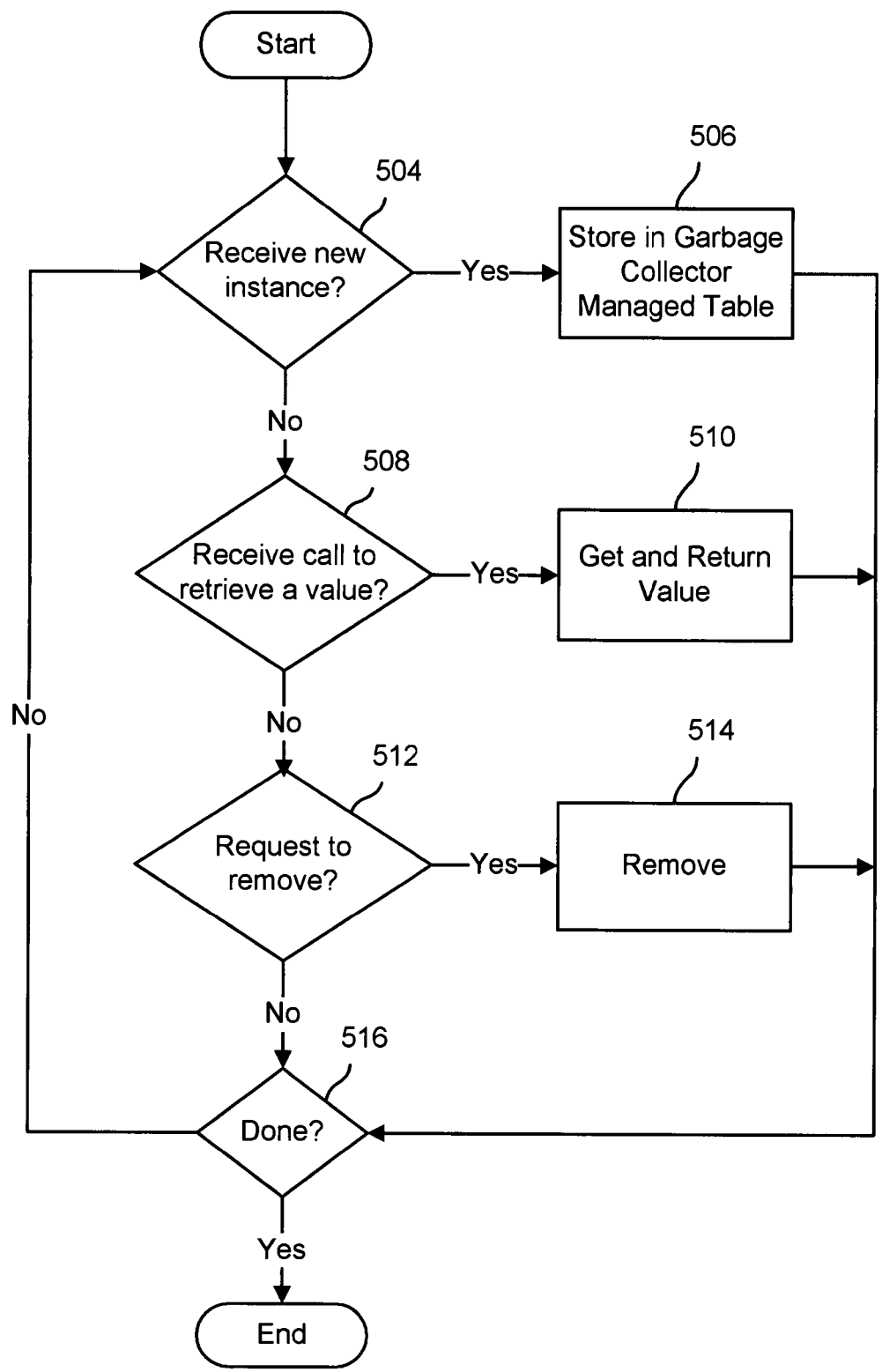
FIG. 5B is a flow chart illustrating an embodiment of a process for adding, retrieving, and/or removing associative references, as applicable.

FIG. 5B is a flow chart illustrating an embodiment of a process for adding, retrieving, and/or removing associative references, as applicable. In some embodiments, 503 of FIG. 5A is implemented at least in part by the process of FIG. 5B. For each new instance of an associative reference that is received (504), e.g., the set_associative_reference call described above, data associating a received key with the referring object and the referred to object are stored (506). For each call to retrieve an associative reference that is received (508), the corresponding value (referred to object) is retrieved and returned (510). For example, a garbage collection process may request retrieval of any associative references associated with an object that has been determined not to be reachable otherwise. If a request to remove an associative reference is received (512), e.g., an application or other process and/or object determines it no longer needs an object to which it previously set an associative reference, the associative reference is removed (514). New associative references may be set, retrieved and/or removed until the process ends (516), e.g., upon shutting down of the runtime environment and/or underlying system.

FIG. 6 is a block diagram illustrating an embodiment of data tables used to store data associated with associative references. In associations table 600, data associating referring objects with sub-tables to which they correspond is stored. In an associative references table 620, data associating each key with a corresponding value, e.g., a pointer to an object to which the associative reference is made, is stored. In some embodiments, tables 600 and 620 comprise hash tables. In some embodiments, table 600 is used by the garbage collector to determine quickly which sub-tables (e.g., associative reference tables) are associated with a reachable object, so that associated objects can be kept alive, and conversely to determine which sub-tables, if any, are associated with an object that has been determined to be unreachable, so that associative references associated with such objects can be removed from the associative reference tables such as table 620. In some embodiments, an application developer must take care to ensure that keys that are unique at least within a universe of keys associated with a particular referring object are used. In some embodiments, the application developer is not required to provide for any data comprising or representing with the associative reference to be stored in any slot or other entity comprising or associated with the referring object, nor is the application developer required to manage the reference and/or the storage or removal of data comprising or otherwise associated with the reference. Instead, so long as a referring object remains reachable, the objects if any to which it has an associative reference as represented by data stored in tables such as 600 and 620 will remain alive and available and, conversely, such references and their enlivening effect will be removed by the garbage collector and/or an associated process, with no further action by the application and/or the referring object, once the referring object becomes unreachable, for example because it is no longer in use. The approaches described herein and data structures such as those shown in FIG. 6 in some embodiments enable an application developer to extend the attributes of an object in a desired way, e.g., by defining a new attribute, without requiring that its class be changed in a way that might affect subclasses adversely and without requiring that the application and/or developer manage the allocation, use, and de-allocation of memory associated with application-managed data structures such as application-managed side tables.

Figure 7:
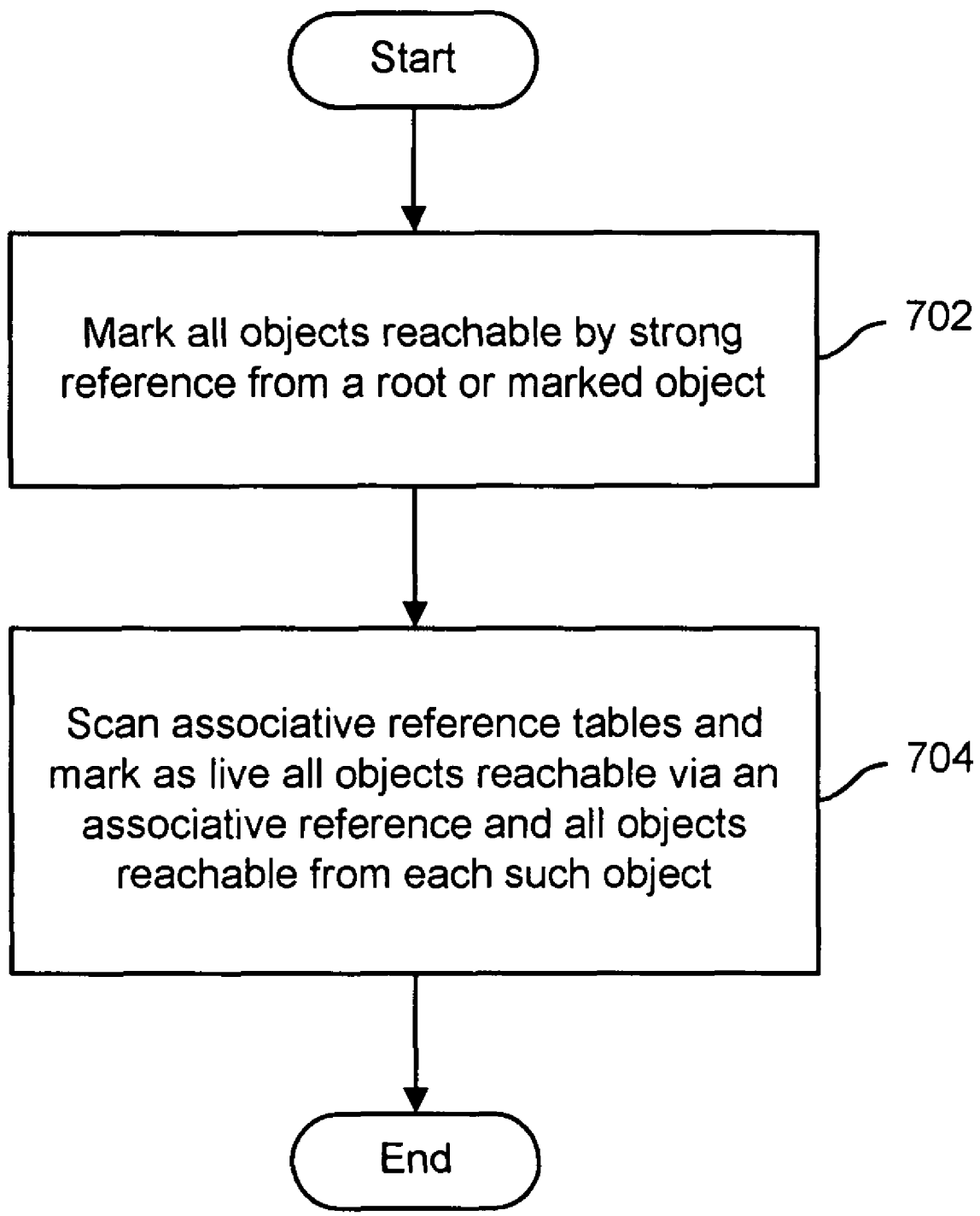
FIG. 7 is a flow chart illustrating an embodiment of a process for a marking phase and/or operation of a garbage collector configured to support associative references.

FIG. 7 is a flow chart illustrating an embodiment of a process for a marking phase and/or operation of a garbage collector configured to support associative references. All objects reachable by a strong reference from a root or otherwise marked object are marked (702). In addition, associative reference tables, such as tables 600 and 620 of FIG. 6, are scanned and all objects reachable via an associative reference from a reachable (e.g., marked) object, and all objects reachable from each such object, e.g., by a strong and/or associative reference from such an object, are marked as live (704). In some embodiments, 704 is performed recursively for each object found to be reachable by an associative reference from a live (e.g., marked) object, until all entries associated with live objects have been processed.

Figure 8:
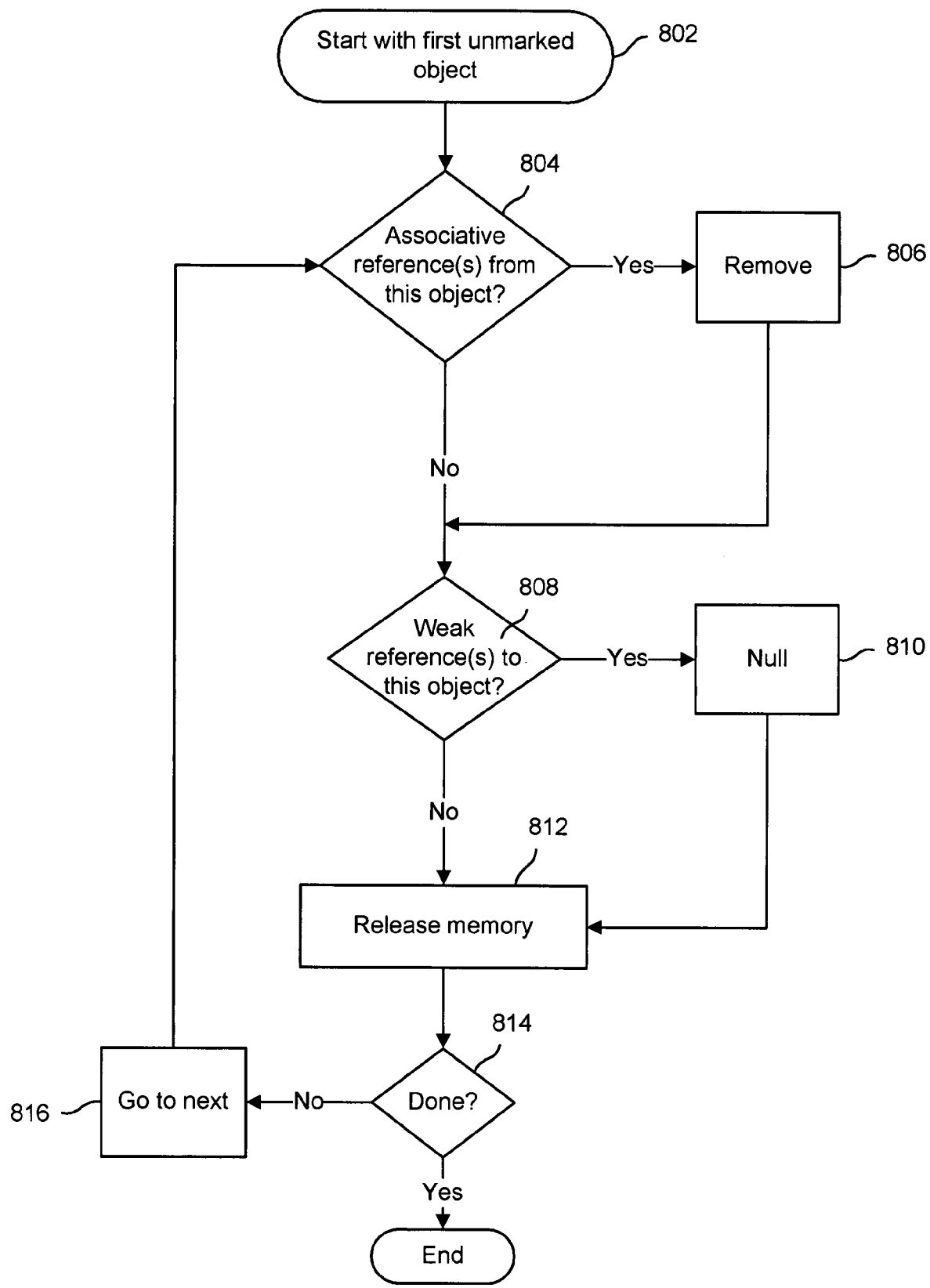
FIG. 8 is a flow chart illustrating an embodiment of a process for a collection (e.g., "sweep") phase and/or operation of a garbage collector configured to support associative references.

FIG. 8 is a flow chart illustrating an embodiment of a process for a collection (e.g., "sweep") phase and/or operation of a garbage collector configured to support associative references. In some embodiments, the process of FIG. 8 is performed on objects with respect to which it has been determined the object is not reachable either by a strong reference or chain of strong references from a root or other reachable object and to which no associative reference from a reachable or otherwise enlivened object is present. Starting with a first unmarked object (802), it is determined whether there are any associative references from that object (804). In some embodiments, the determination is made by checking an associations table such as table 600 of FIG. 6 for entries associated with the object. Any associative references from the object are removed (806), e.g., by deleting associated entries in tables or other data structures such as associations table 600 and references table 620 of FIG. 6. Removal of associative references from an object that is determined to be unreachable and to have no associative reference to it ensures that the objects referenced in such associative references are not kept alive solely by virtue of having previously been the object of an associative reference from an object that is no longer in use and/or even in existence. Note that the process of FIG. 8 is performed in some embodiments by the garbage collector and/or an associated process, with the result that the application developer does not have to worry about cleaning up entries comprising and/or associated with associative references. Next, if there are any weak references to the object (808), those references are nulled (810) as described above. Once any associative references, if any, from the object have been removed and any weak references to the object, if any, have been nulled, the memory allocated previously to the object is release for other use (812). The process is repeated for each unmarked object until all unmarked objects have been processed (814 and 816).

Figure 9:
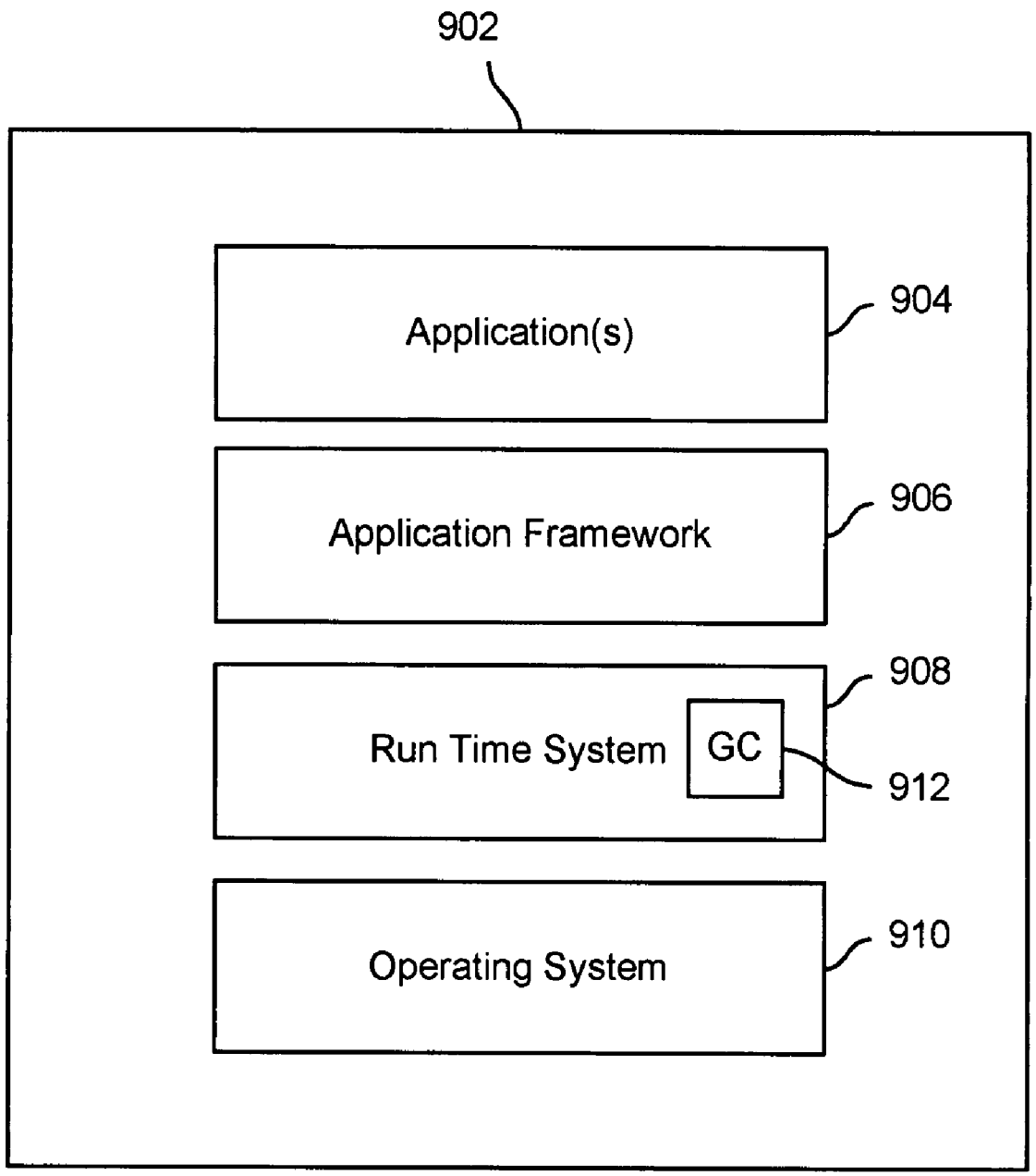
FIG. 9 is a block diagram illustrating an embodiment of a runtime system that provides associative references.

FIG. 9 is a block diagram illustrating an embodiment of a runtime system that provides associative references. In the example shown, a computer system 902 comprises one or more applications 904 running on an application and/or development framework 906 associated with a run time system 908 that runs on an operating system 910. In various embodiments, the run time system 908 may be one of a plurality of runtime environments running on the operating system 910. In some alternative embodiments, more or fewer entities than those shown in FIG. 9 are present. In the example shown, the run time system 908 includes a garbage collector 912 configured to provide for, manage, and enforce associative references as described above. In some embodiments, garbage collector 902 is configured to implements the processes of FIGS. 5, 7, and 8. In some embodiments, garbage collector 902 is configured to store in tables or other data structures, such as tables 600 and 620 of FIG. 6, data representing associative references made by referring objects to referred to objects, and to manage such data and provide the enlivening consequence of such references, as described above.

Using techniques described herein, the attributes and/or other data associated with classes of objects can be extended and defined in a very flexible manner without requiring changes in object classes that might affect adversely subclasses based on such classes and without requiring the application developer to manage potentially very complicated relationships between application objects and ancillary objects and/or data structures such as side tables, while maintaining the benefits of programming in a garbage collected environment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing memory, comprising:
   receiving an indication that an object is not reachable from any root object; and keeping the object alive, in the same manner as if the object were reachable from a root object, if it is determined by a garbage collection process, based at least in part on data other than data comprising the object or managed by an application with which the object is associated, that the object is associated strongly, by data other than data comprising the object or managed by an application with which the object is associated, with at least one other object that has been determined to be reachable;
   wherein the garbage collection process is configured to check, prior to collecting said object determined to not be reachable from any root object, a data structure managed by the garbage collection process to determine which of at least a subset of other objects that have been determined to be reachable from a root object have references made other than through an entry in a global or local variable to one or more other objects, and to ensure said one or more other objects, if any, are kept alive; and
   wherein the data structure comprises an associative references table that associates with each of a set of one or more opaque keys a corresponding value that comprises or identifies the object to which the associative reference with which the opaque key is associated has been made;
   wherein the object is kept alive by the opaque key when said one or more other objects have been determined not to be reachable from any root object.

2. A method as recited in claim 1, wherein receiving an indication that an object is not reachable comprises receiving an indication that the object is not reachable via a chain of one or more explicit references originating at a root object.

3. A method as recited in claim 1, wherein the determination that the object is associated with at least one other object is based at least in part on data managed by the garbage collection process or a process associated with the garbage collection process.

4. A method as recited in claim 1, wherein the determination that the object is associated with at least one other object is based at least in part on data in a set of data managed by the garbage collection process for objects associated with a run time system with which the garbage collection process is associated.

5. A method as recited in claim 1, wherein the data structure comprises a hash table.

6. A method as recited in claim 1, wherein the data structure comprises an associations table that associates with a referencing object one or more keys.

7. A method as recited in claim 1, further comprising keeping alive any object that the garbage collection process determines is associated with an object that is to be kept alive by virtue of the garbage collection process having determined based at least in part on data associated with the garbage collection process that the object that is to be kept alive is associated with one or more objects that have been determined to be reachable.

8. A method as recited in claim 1, further comprising garbage collecting the object if it is determined that the object is not associated with any reachable object by data other than data comprising the object or managed by an application with which the object is associated.

9. A method as recited in claim 8, wherein garbage collecting the object comprises nulling any weak references to the object.

10. A method as recited in claim 8, wherein garbage collecting the object comprises removing from a data structure associated with the garbage collection process any entries, if any, that represent an associative reference from the object to another object.

11. A method as recited in claim 1, further comprising receiving a definition of an operation that enables a referring object or other code with which the referring object is associated to provide to the garbage collection process a reference data that identifies a referred to object that the garbage collection process is required to keep alive so long as the referring object remains reachable, even if the referred to object is determined to be otherwise unreachable.

12. A method as recited in claim 1, further comprising receiving from a referring object a reference data that identifies a referred to object in such a way that the garbage collection process will keep the referred to object alive so long as the referring object remains reachable, even if the referred to object is determined to be otherwise unreachable.

13. A computer system comprising:
   a run time system configured to:
      receive an indication that an object is not reachable from any root object; and
      keep the object alive, in the same manner as if the object were reachable from a root object, if it is determined by a garbage collection process associated with the run time system, based at least in part on data other than data comprising the object or managed by an application with which the object is associated, that the object is associated strongly, by data other than data comprising the object or managed by an application with which the object is associated, with at least one other object that has been determined to be reachable; and
   a memory configured to store said data other than data comprising the object or managed by an application with which the object is associated;
   wherein the garbage collection process is configured to check, prior to collecting said object determined to not be reachable from any root object, a data structure managed by the garbage collection process to determine which of at least a subset of other objects that have been determined to be reachable from a root object have references made other than through an entry in a global or local variable to one or more other objects, and to ensure said one or more other objects, if any, are kept alive and
   wherein the data structure comprises an associative references table that associates with each of a set of one or more opaque keys a corresponding value that comprises or identifies the object to which the associative reference with which the opaque key is associated has been made;
   wherein the object is kept alive by the opaque key when said one or more other objects have been determined not to be reachable from any root object.

14. A system as recited in claim 13, further comprising a processor configured to provide the run time system.

15. A system as recited in claim 13, wherein the application with which the object is associated runs in a run time environment provided by the run time system.

16. A system as recited in claim 13, wherein the object resides in a memory heap associated with the run time system, the memory heap comprising a portion of said memory that has been allocated to said run time system.

17. A computer program product for managing memory, the computer program product being embodied in a computer readable medium and comprising computer instructions for:
  receiving an indication that an object is not reachable from any root object; and
  keeping the object alive, in the same manner as if the object were reachable from a root object, if it is determined by a garbage collection process, based at least in part on data other than data comprising the object or managed by an application with which the object is associated, that the object is associated strongly, by data other than data comprising the object or managed by an application with which the object is associated, with at least one other object that has been determined to be reachable;
  wherein the garbage collection process is configured to check, prior to collecting said object determined to not be reachable from any root object, a data structure managed by the garbage collection process to determine which of at least a subset of other objects that have been determined to be reachable from a root object have references made other than through an entry in a global or local variable to one or more other objects, and to ensure said one or more other objects, if any, are kept alive and
  wherein the data structure comprises an associative references table that associates with each of a set of one or more opaque keys a corresponding value that comprises or identifies the object to which the associative reference with which the opaque key is associated has been made;
  wherein the object is kept alive by the opaque key when said one or more other objects have been determined not to be reachable from any root object.

* * * * *